United States Patent [19]
Bishop et al.

[11] Patent Number: 5,840,241
[45] Date of Patent: Nov. 24, 1998

[54] METHOD OF ALIGNING FIBROUS COMPONENTS OF COMPOSITE MATERIALS USING STANDING PLANAR COMPRESSION WAVES

[76] Inventors: Richard Patten Bishop, P.O. Box 10495, Burke, Va. 22009; Bradbury Robinson Face, 334 S. Church St., Smithfield, Va. 23430

[21] Appl. No.: 812,178
[22] Filed: Mar. 6, 1997

Related U.S. Application Data

[60] Provisional application No. 60/014,503 Apr. 2, 1996.
[51] Int. Cl.$^6$ .............................. B29B 13/08; B06B 3/00
[52] U.S. Cl. ........................ 264/437; 264/442; 264/443; 425/174.2; 204/157.42
[58] Field of Search .................... 264/437, 442, 264/443, 407; 425/174.2; 204/157.42

[56] References Cited

U.S. PATENT DOCUMENTS

| | | | |
|---|---|---|---|
| 3,041,670 | 7/1962 | Broderson | 264/442 |
| 3,306,835 | 2/1967 | Magnus | 264/443 |
| 3,668,096 | 6/1972 | Cook . | |
| 4,062,913 | 12/1977 | Miller et al. | 264/443 |
| 5,068,068 | 11/1991 | Furusawa et al. | 264/442 |
| 5,093,050 | 3/1992 | Tepic | 264/443 |

*Primary Examiner*—Mathieu D. Vargot
*Attorney, Agent, or Firm*—Stephen Clark

[57] ABSTRACT

Standing planar compression waves are used to control the spacing and alignment of previously randomly distributed and randomly oriented loose fibrous elements in a fluid medium. Standing planar compression waves are established within the medium by a magnetostrictive or piezoelectric transducer. The fibrous elements gravitate to the nodes of the standing waves and align themselves parallel to the vibrating surface of the transducer. The composite material may be solidified by cooling (or other process), which freezes the fibrous elements in an aligned array, thereby effecting the directional dependency of various structural properties of the composite material (including compression strength, tensile strength, and modulus of elasticity).

6 Claims, 7 Drawing Sheets

METHOD OF ALIGNING FIBROUS COMPONENTS OF COMPOSITE MATERIALS USING STANDING PLANAR COMPRESSION WAVES

CROSS REFERENCE

This application claims the benefit of U.S. Provisional application Ser. No. 60/014,503, filed Apr. 2, 1996.

BACKGROUND OF THE INVENTION

1. Field of Invention

The present invention relates to a method and apparatus for aligning fibrous components of materials. More particularly the present invention relates to a method and apparatus for applying compression waves to temporarily molten or liquified materials to effect the substantially parallel alignment of fibrous components within the materials.

2. Description of the Prior Art

Many-composite materials are available which comprise fibrous elements or "whiskers" which are randomly distributed throughout a base material. Common fabrication materials such as graphite composites and fiberglass composites are examples of such materials. Fibers and whiskers are typically used in such composite materials in order to take advantage of the relatively high tensile strength of the fibrous elements vis-a-vis the base materials. By randomly distributing whiskers throughout a relatively low strength base material the yield strength of the composite becomes greater than that of the base material alone, due primarily to the fact that for any force applied to the composite material, some portion of the (relatively high tensile strength) whiskers will always be aligned parallel to the direction of the applied force. Typically the macroscopic properties (eg. tensile strength, yield strength, modulus of elasticity, etc.) of such composite materials are independent of the physical orientation of the materials or the direction of application of external forces upon the materials. Thus, such materials are inherently no stronger in one direction than they are in any other direction.

Certain structures (for example cables, belts, columns, beams, etc.) are commonly subjected to loads which are predominantly directed only along, or parallel to, particular axes of the respective structures. In the case of cables, for example, under normal conditions most of the stresses are usually applied only axially along the cables. Similarly, belts are typically exposed to relatively higher stresses parallel to their longitudinal axis than in other directions. It is frequently desirable, therefore, to construct such structures of materials in which their tensile and/or compressive strength parallel to one axis of the structure is substantially greater than its tensile and/or compressive strength in other directions.

A prior method of producing materials which are inherently stronger parallel to one axis than in other directions comprises aligning a plurality of elongated wires, cables, filaments or the like parallel to a common axis and embedding them within a base material. The resulting composite material is typically stronger parallel to the axes of the embedded materials than in other directions. Concrete structures with aligned and embedded reinforcing bars, and composite plastics having embedded woven glass fabrics, are examples of such structural materials whose tensile strength, compressive strength, and modulus of elasticity all vary depending upon the direction of the applied loads.

Prior methods of fabricating composite materials comprising aligned filaments, wires, rods and similar embedded elements typically require the use relatively long embedded elements because of the necessity to manually or mechanically handle and place the embedded elements in a fixed orientation relative to each other and to the base material. However, because of the difficulty, (indeed the near practical impossibility), of manually or mechanically handling and placing microscopic fibers, filaments, or chains, and the difficulty in handling and placing macroscopic whiskers and other small loose fibers, prior composite materials typically do not comprise such elements in aligned arrays. Thus, whenever such small fibrous elements are used in prior composite materials they are typically randomly distributed and randomly oriented; and, being randomly distributed and randomly oriented, such small fibrous elements provide the prior composite materials with no structural properties which are dependent upon the direction of application of applied external loads.

SUMMARY OF THE INVENTION

Accordingly, it is a primary object of the present invention to provide a method of controlling the relative alignment of small whiskers, filaments and/or fibrous elements which are loosely immersed within a base material.

It is another object of the present invention to provide a method of the character described wherein the base material in which the small whiskers, filaments and/or fibrous elements are loosely immersed is (at least temporarily) a fluid, and wherein vibrations are introduced into the fluid which physically displace the immersed elements in a controlled fashion.

It is another object of the present invention to provide a method of the character described by which the immersed elements are advantageously realigned by the vibrations so as to become substantially parallel to each other.

It is another object of the present invention to provide a method of the character described wherein the vibration wave is a standing planar compression wave, and wherein the axis of the wave is perpendicular to the final orientation of the preferred longitudinal axes of the immersed fibers, so that the individual randomly oriented whiskers, filaments and/or fibrous elements tend to migrate towards and become aligned within the nodes of the standing wave.

It is another object of the present invention to provide a method of the character described wherein the standing planar compression waves are produced by and between a pair of opposing vibrators working in concert.

Further objects and advantages of the invention will become apparent from a consideration of the drawings and ensuing description thereof.

DESCRIPTION OF THE PREFERRED EMBODIMENT

The preferred embodiment of the present invention is a method by which a standing compression wave is generated in a fluid medium (generally designated 10 in the figures) so as to advantageously align fibrous elements 12 immersed within the medium 10.

Figure 1:
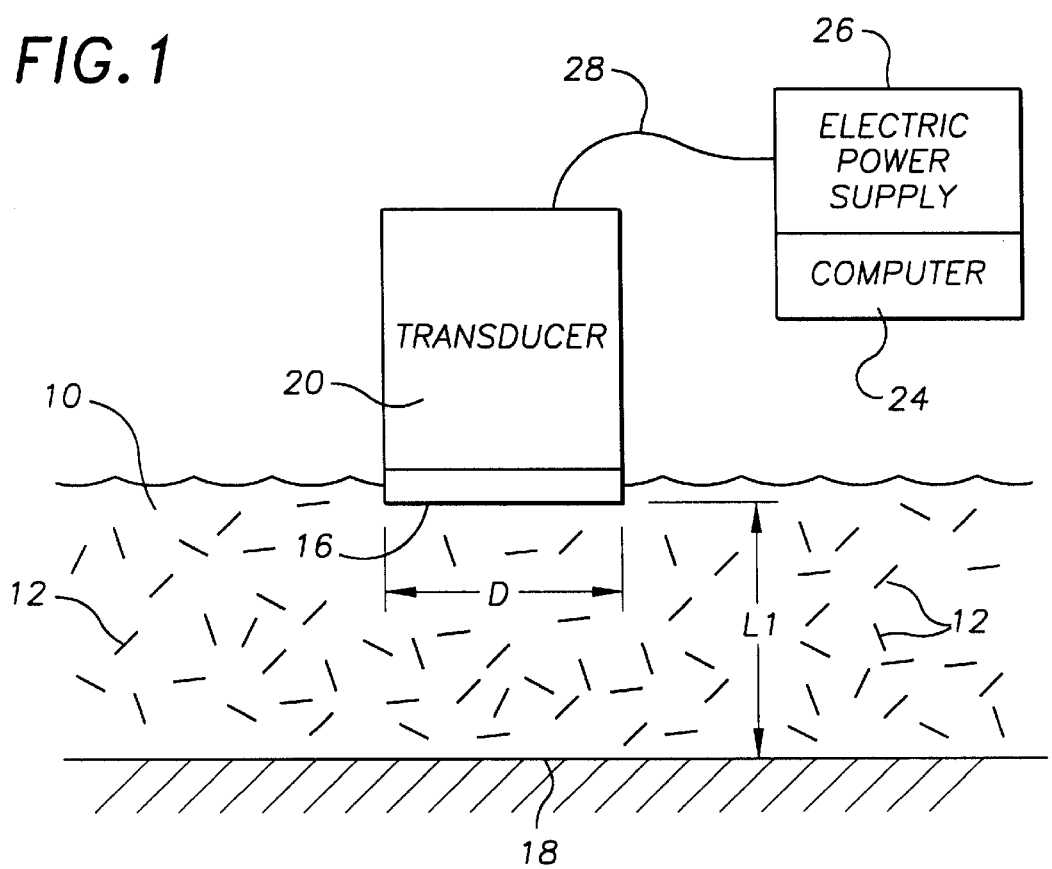
FIG. 1 is a schematic elevation view illustrating a fluid medium comprising randomly distributed and randomly oriented fibers.
Figure 2:
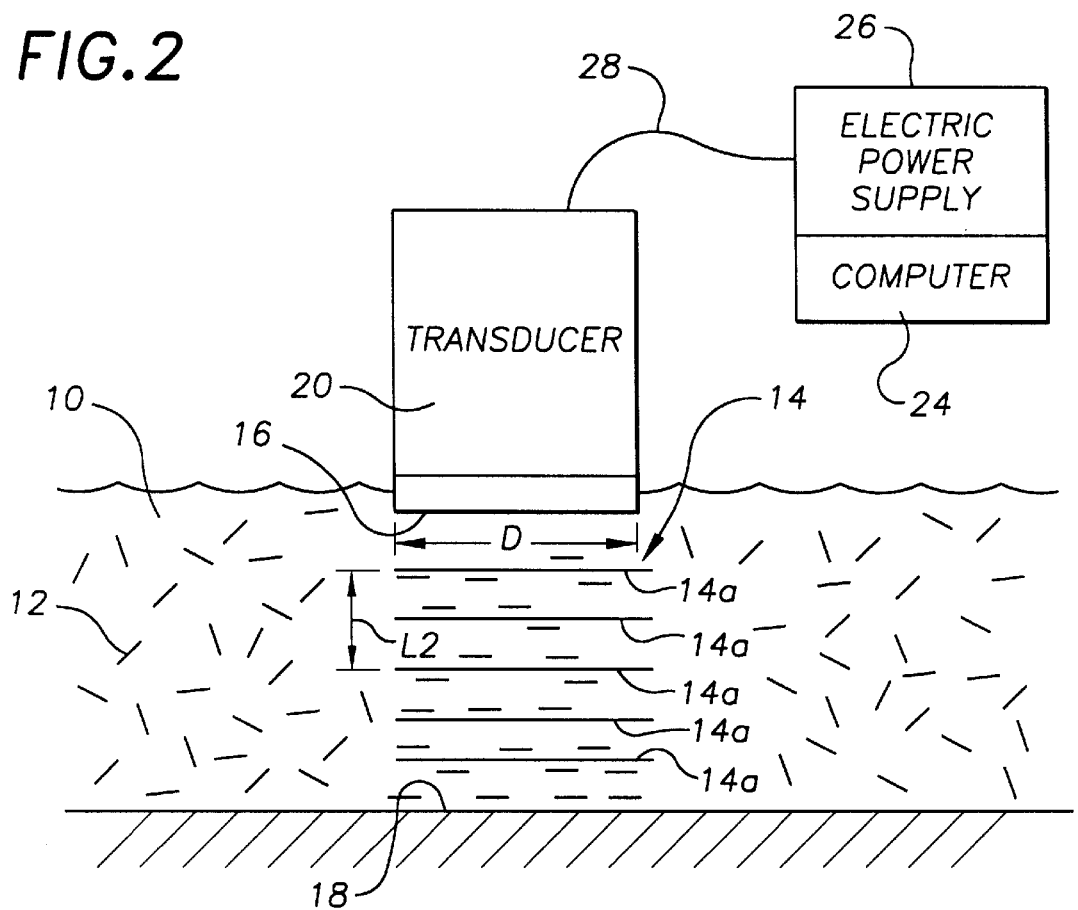
FIG. 2 is a schematic elevation view similar to FIG. 1 illustrating a vibrator apparatus generating a standing compression wave in the fluid medium in accordance with the present invention.

Referring to FIGS. 1 and 2, a standing compression wave 14 having a wave axis extending between a vibrating surface 16 of a transducer 10 and an opposing reflective surface 18 is established in the fluid medium 10. The transducer 20 preferably comprises a flat circular vibrating surface 16 which may be operationally placed in contact with the fluid medium 10 and oriented parallel to the reflective surface 18. In the preferred embodiment of the invention the circular vibrating surface 16 is of diameter D, and the reflective surface is at least as wide as the vibrating surface 16. The transducer 20 is in electrical communication with a computer 24 via electrical conductor 24. The computer 24 is connected to an electric power supply 26.

In order to establish a standing compression wave 14 between the transducer (or more particularly, between the vibrating surface 16) and the reflective surface 18, the distance L1 between the vibrating surface 16 and the reflective surface 18 must be an integer number of half wavelengths of the standing compression wave, such that there occurs an antinode of the standing wave 14 at the vibrating surface 16 and a node of the standing wave 14 at the reflective surface 18.

As used herein, "transducer" refers to any device by means of which the energy of one power system may be transmitted to another system (whether of the same type or not); or, more particularly, any device by means of which electrical energy is converted to mechanical vibrational energy which may subsequently be transmitted to the fluid medium 10. In the preferred embodiment of the invention, the transducer 20 comprises a magnetostrictive element which is capable of axially oscillating in response to electrical signals supplied to the transducer 20 from an external electrical power supply 26 (via electrical conductor 28). A transducer 20 comprising a magnetostrictive element may be advantageously used in accordance with the present invention to produce controlled vibrations in the frequency range of 150 Hz to 25 KHz; while a piezoelectric transducer element may be advantageously used to produce vibrations in a higher and wider frequency range (eg. from 1 hertz to 1 megahertz). Transducers comprising other energy conversion means may alternatively be used in accordance with the present invention.

In the preferred embodiment of the invention the vibrating surface 16 oscillates back and forth in a direction of motion perpendicular to the vibrating surface 16 and the reflecting surface 18. It will be understood that vibrational energy will propagate through the fluid medium 10 in accordance with the nature of the vibration, the characters of the vibrating surface 16 and the reflecting surface 18, and the local speed of sound of the fluid medium 10. In the preferred embodiment of the invention the vibrating surface 16 is oscillated at a frequency sufficient to generate a substantially cylindrical compression wave having substantially planar wave fronts. In order to generate a substantially cylindrical planar compression wave 14, the wave length L2 of the wave 14 being generated should be substantially smaller than the diameter D of the vibrating surface 16. In the preferred embodiment of the invention, in order to generate cylindrical planar compression waves of high resolution, the diameter D of the vibrating surface 16 is at least four times as great as the wave length L2 of the compression wave 14 produced by the oscillation of the vibrating surface 16.

This relationship between the wavelength L2 of the wave being generated and the diameter D of the vibrating surface 16 may be mathematically expressed by the equation $$L2 \ll D. \tag{1}$$

The wavelength L2 may be mathematically expressed by the equation $$L2 = V/f, \tag{2}$$

where V is the speed of sound and f is frequency of the sound wave.

Thus, equation (1) may be rewritten as $$L2 \ll D$$

$$V/f \ll D \tag{3}$$

$$V/D \ll f. \tag{4}$$

Accordingly, as will be appreciated by one skilled in the art, it is evident that this relationship inherently implies that the frequency of the wave being generated should be greater than the local speed of sound in the medium divided by the diameter D of the vibrating surface 16.

The wave 14 produced by the vibrating surface 16 is a standing compression (longitudinal) wave 14, resulting from the superposition of two similar plane waves of identical frequency and amplitude, travelling in opposite directions. Because the diameter D of the vibrating surface 16 is large relative to the wave length L2 of the wave produced, the oscillations generate an ultrasonic "beam" that is unidirectional with substantially planar wave fronts; but the lateral extent of the "beam" remains substantially the same as the diameter D of the vibrating surface 16.

Referring now to FIG. 2: Once a standing compression wave 14 has been established within the fluid medium 10 between the vibrating surface 16 and the reflective surface 18, a series of stationary nodes 14a will occur, equally spaced apart at a distance of ½ wavelength (e.g. ½×L2) along the axis of the wave. Because of the pressure gradients which exist at all other locations within the vibration-affected volume of the fluid medium 10, loose fibrous elements 12 within the vibration-affected volume of the fluid medium 10 will naturally gravitate towards the nodes 14a of the compression wave. Not only will the loose fibrous elements 12 tend to gather in the various nodes 14 of the compression wave, but, because the compression waves are planar, those fibrous elements 12a will tend to become aligned parallel to the wave fronts (i.e. parallel to the vibrating surface 16).

Figure 3:
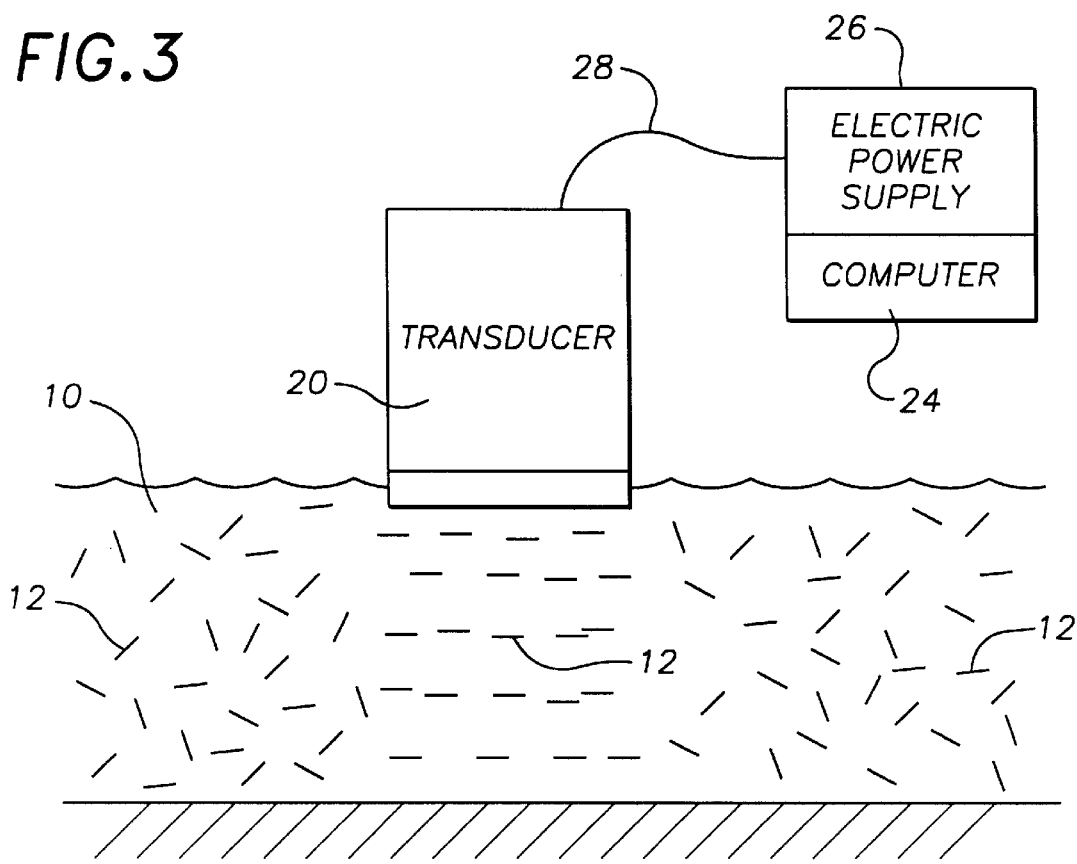
FIG. 3 is a schematic elevation view similar to FIG. 2 showing the parallel alignment of fibers in a medium after removal of the standing compression wave.

Referring now to FIG. 3: After the various fibrous elements 12 within the vibration-affected volume of the fluid medium 10 have become aligned in a uniformly spaced parallel array in the manner described above, the transducer 20 may be turned off, and the positioning of the fibrous elements 12 will remain substantially in place for a time period which depends on respective physical, chemical and electrical properties of the fluid medium 10 and the fibrous elements 12. In the preferred embodiment of the invention the above described vibrations and advantageous alignment of the fibrous elements is accomplished while the fluid medium is at an elevated temperature (eg. above the melting point of the particular medium). Once the desired alignment of the fibrous elements 12 is accomplished, the temperature of the medium 10 is allowed to drop below the melting temperature of the medium, thereby permanently "freezing" the fibrous elements 12 in the desired orientation. It will be understood that a composite solid material thus formed of a base material comprising a "frozen" fluid medium (10) and an array of uniformly spaced parallel planes of high-strength fibrous elements 12 will have relatively higher tensile strength in certain directions (i.e. in a plane parallel to the axes of the various aligned fibrous elements) than in other directions. Although the above disclosure describes the "freezing" of a once-fluid medium (eg. fluid medium 10) into a solid in order to produce a solid material having an aligned array of fibrous elements 12, it is understood that the solidification of the once-fluid medium 10 may be caused by any thermal, chemical or other process which hardens the fluid medium while substantially maintaining the described positioning and orientation of the fibrous elements in the described array.

After the once-fluid medium (i.e. fluid medium 10) and the aligned fibrous elements 12 have solidified into a composite structure, the resulting composite structure will have more tensile strength in a direction parallel to the axes of the aligned fibrous elements 12 than in other directions, owing principally to the fact that the individual aligned fibers, (each having greater tensile strength than that of the base material, per se), have greater tensile strength that bending strength.

It will be appreciated that it is desirable to employ small, loose fibrous elements as strengthening members in composite materials because (unlike much larger elongated reinforcement structures) such elements are easily handled and mixed in bulk, and can be readily combined in bulk with other materials for extruding and molding.

Figure 4:
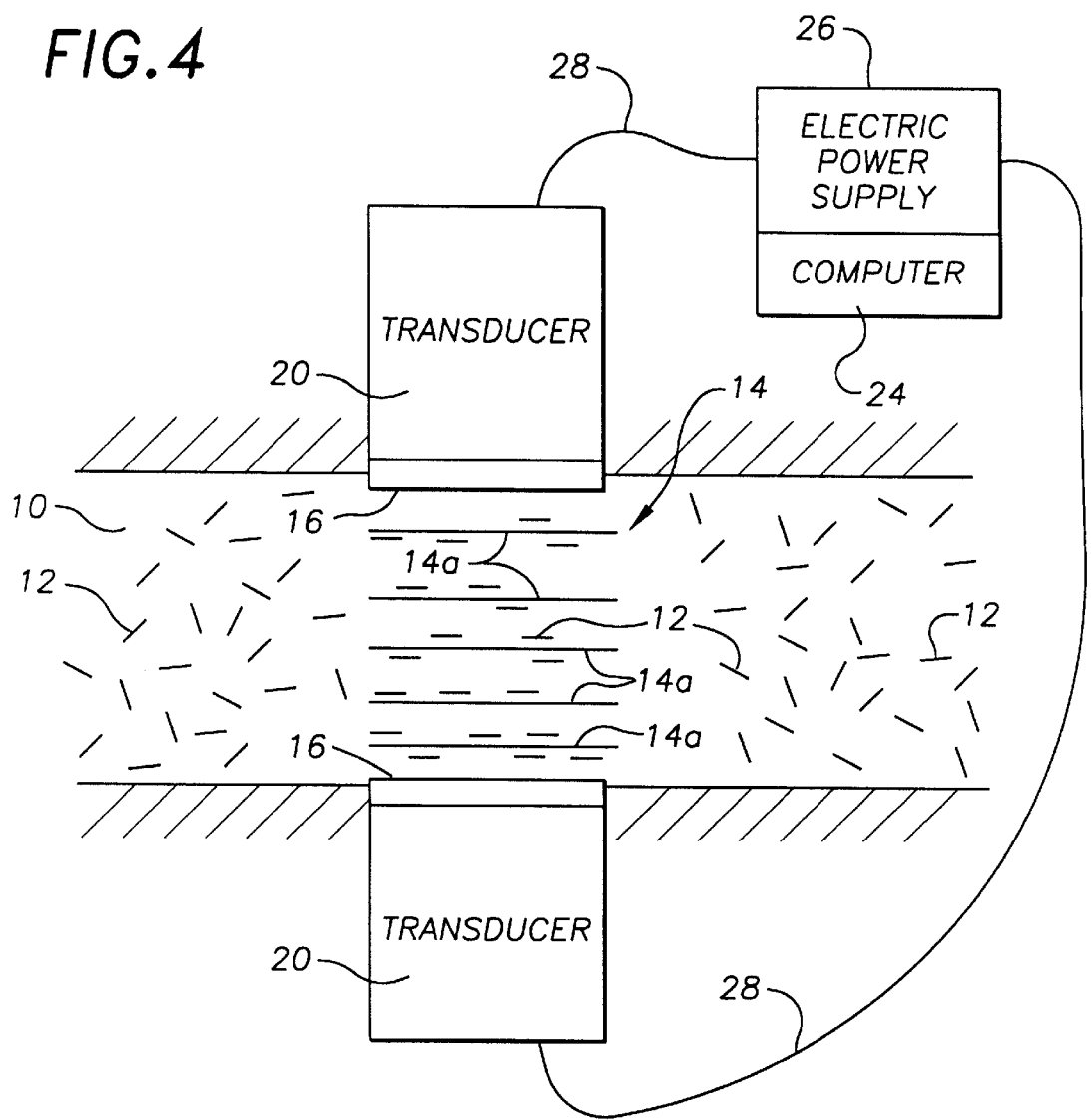
FIG. 4 is a schematic elevation view showing a pair of matched vibrators generating a standing compression wave in a fluid medium in accordance with a modification of the present invention.
Figure 5:
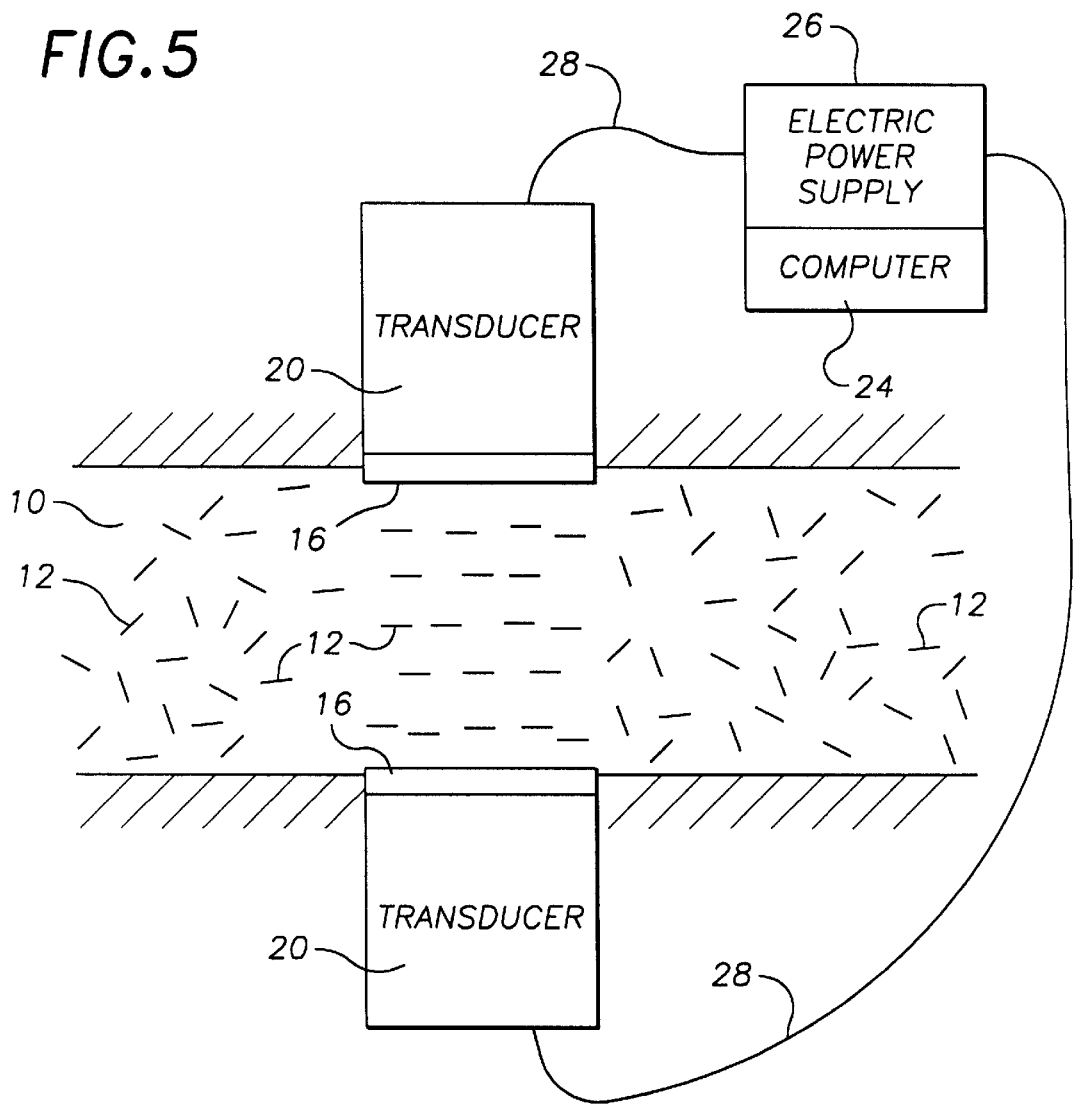
FIG. 5 is a schematic elevation view similar to FIG. 4 showing the parallel alignment of fibers in a medium after removal of the standing wave.

In the above disclosure a standing compression wave 14 is established in a fluid medium 10 by and between a single transducer and a reflective surface 18. FIGS. 4 and 5 illustrate a modification of the present invention wherein the standing compression wave is established by a pair of matched transducers working in concert.

Figure 7:
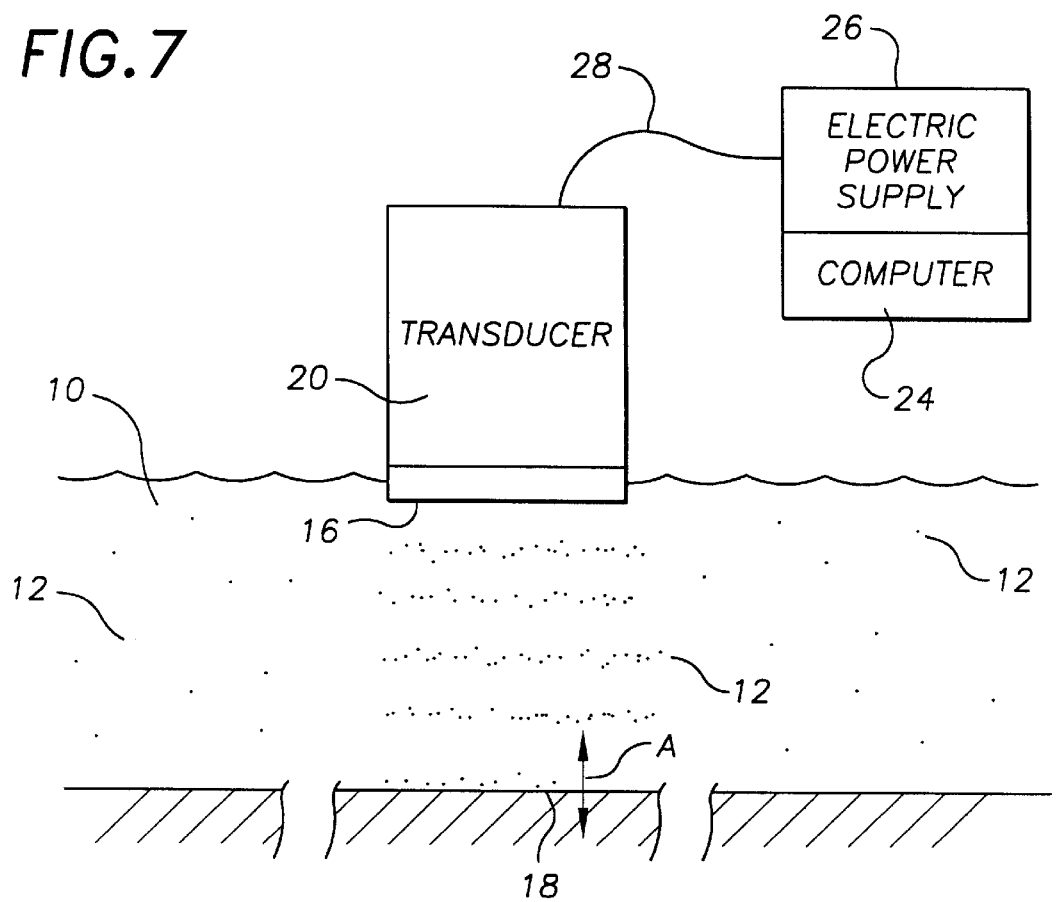
FIG. 7 is a schematic elevation view illustrating oscillation of the reflective surface.

Now referring to FIG. 7: In another modification of the invention, the reflective surface 18 may be oscillated in a direction perpendicular to the reflective surface 18 (indicated in FIG. 7 by arrow A) at a frequency. This frequency may be a second frequency in phase with the frequency at which the vibrating surface 16 of the transducer 20 is oscillated. Also, the phase angle of oscillation of the reflective surface 18 may be controlled to correspond to the phase angle of oscillation of the vibrating surface 16 of the transducer 20.

Although the figures illustrate a method of aligning fibrous elements within a selected "vibration-affected volume" of a fluid medium, it will be understood that one or more vibration surfaces having sufficiently large area may affect not just selected portions of a fluid mass, but to so affect a whole fluid mass. It will also be understood that the above described method of aligning fibrous elements within a vibration-affected volume of a fluid may be practiced with a fluid medium which is moving parallel to the vibrating surface(s), or vice-versa, so as to affect a larger volume the fluid medium.

Figure 6:
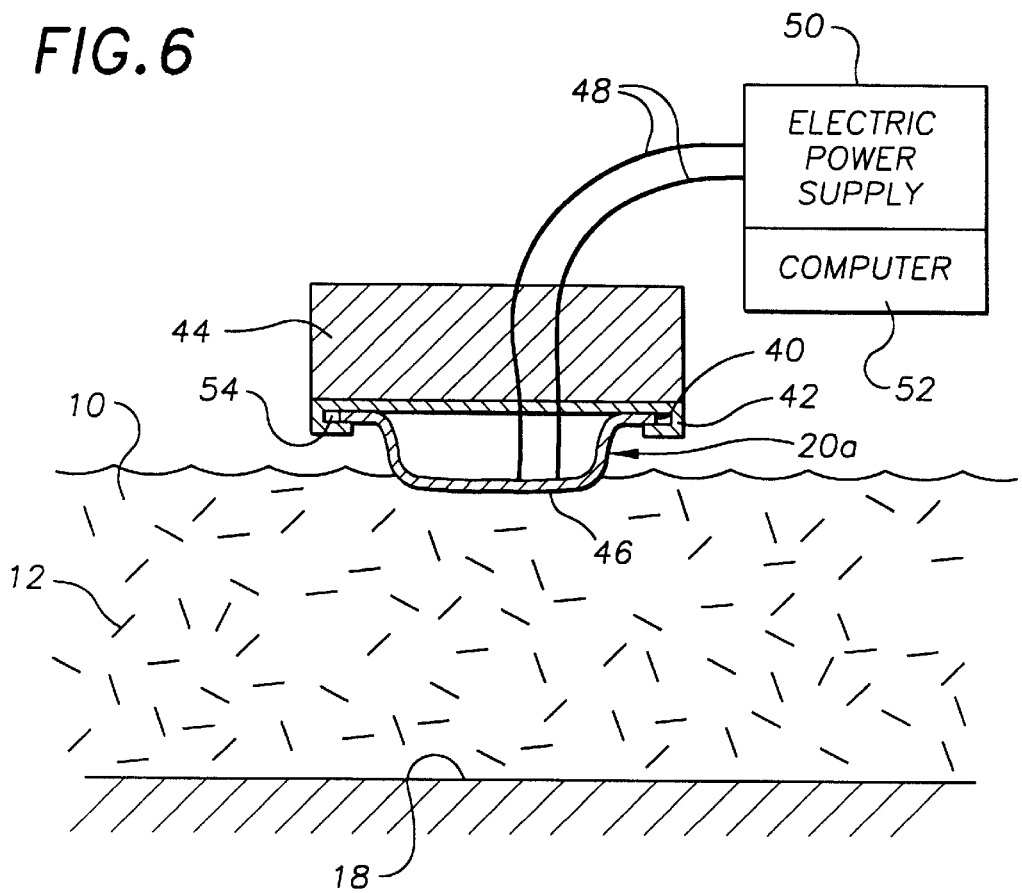
FIG. 6 is a schematic elevation view showing a piezo-electric transducer used in a modification of the present invention.

In the preferred embodiment of the invention a standing compression wave 14 is generated by the oscillation of a vibrating surface 16 in communication with a magnetostrictive transducer 20. In an important modification of the present invention, the standing compression wave may be produced by one or more piezoelectric transducers 20a, as shown in FIG. 6. In this modification of the invention a piezoelectric transducer element 20a is loosely attached at its periphery 40 to a vibrator support 42. The vibrator support 42 may be attached to a frame 44 which is of relatively large mass as compared to the weight of the piezoelectric transducer element 32a. The piezoelectric transducer element 32a preferably has a substantially flat vibrator surface 46 which oscillates back and forth perpendicular to the plane of the vibrator surface 46 when energized by an alternating current. The alternating current may be provided to the piezoelectric transducer element 32a via electric conductors 48 which are in electrical communication with an electric power supply 50 and computer 52. The vibrator support 42 preferably has an expansion cavity 54 which allows for radial movement of the periphery 40 of the piezoelectric transducer element 32a, but which restricts movement of the periphery 40 of the piezoelectric transducer element 32a in the axial direction. The piezoelectric transducer element 32a preferably is a "unimorph" actuator which predominantly deforms only axially (i.e. perpendicular to the plane of the vibrating surface 46) when energized.

It will be appreciated that standing cylindrical compression waves (for example wave 14) have two unique properties which contribute markedly to their usefulness for this invention. First, they are not attenuated with distance to the degree that spherical waves are, as they exhibit little spherical spreading. Second, their extent is limited to the cylindrical space generated between the circular vibrating surface 16 of the transducer 20, so they do not "leak" sound out into surrounding regions of the fluid medium 10. Although the foregoing describes the preferred method of practicing the present invention, it is within the scope of the invention to advantageously align the loose fibrose elements 12 within a fluid medium 10 using any standing planar compression wave, including waves which are not confined to a definable "beam".

It will be understood that the foregoing describes a method of aligning small, loose, fibrous elements in a fluid medium by exposing the medium and the fibrous elements to a standing compression wave. It will be appreciated by those skilled in the art that such a method can be practiced upon a composite material either to modify the directional dependency of certain strength characteristics (eg. tensile strength, compressive strength, modulus of elasticity, etc.) of the material, or may alternatively be used to magnetically, electrically, optically or otherwise polarize the composite material. A method of aligning fibrous elements of a composite material may alternatively be used to produce filtering media (eg. mesh materials) whose filtering capabilities (eg. mesh or screen opening size) depends upon the spacing between adjacent lines of parallel fibrous elements. It will be understood that in the present invention the spacing between adjacent lines of parallel fibrous elements corresponds to the spacing between nodes of the standing compression wave, which spacing may be readily controlled by adjusting the frequency of the standing compression wave.

Because the above described process may be used to controllably align loose fibrous elements within a medium, the present invention may be used to open or close an electrical, magnetic or optical switch depending on the electrical, magnetic or optical characteristics of the medium and the fibrous elements.

As discussed above, in the preferred embodiment of the invention parallel alignment of fibrous elements 12 is advantageously accomplished in the manufacture of a composite material by producing a standing planar compression wave in a once-fluid medium 10. As discussed above, by using a standing wave there is an tendency for the loosely supported fibrous elements 12 to gather at the nodes 14a of the standing wave. Because the nodes 14a are uniformly spaced along a standing wave (in a substantially homogenous medium) the fibrous elements 12 tend to gather into uniformly spaced apart lines (corresponding to the locations of the nodes of the standing wave). It is, however, within the scope of the present invention to accomplish the controlled alignment of the loosely supported fibrous elements 12 within a fluid medium 10 by subjecting the fibrous elements 12 and the fluid medium 10 to a travelling compression wave. When a travelling compression wave is employed in this modification of the invention, the various fibrous elements will tend to orient themselves parallel to (or tangential to) the wave fronts, but they will not tend to gather in uniformly spaced apart lines. This modification of the invention has the advantage of producing unidirectional structural properties in the composite material without necessitating the generation of a standing wave in the fluid medium 10.

Furthermore, as discussed previously above, in the preferred embodiment of the invention it is desirable to effect the parallel alignment of fibrous elements in a composite material by subjecting the fibrous elements 12 and the once-fluid medium 10 in which the are immersed to planar compression waves. In the preferred embodiment of the invention, planar waves are employed because, having planar wave fronts the fibrous elements 12 tend to align themselves in a parallel array, which may be particularly advantageous and desirable in composite materials which are fabricated as sheets, plates or other planar shapes. However, it is also within the scope of the present invention to effect the uniform, non-parallel alignment of fibrous elements in composite materials by the use of non-planar, travelling compression waves. By way of example a constant frequency spherical compression wave may be introduced from a submersed point source into a fluid medium in which small, loosely supported, randomly distributed and randomly oriented fibrous elements are immersed. The spherical wave fronts of such waves will tend to orient the small fibrous elements tangential to the spherical wave fronts. The fluid medium may then be solidified, "freezing" the various fibrous elements into a generally spherical array. Such a spherical array of reinforcing fibers would be particularly useful, for example, to enhance the tensile strength of curved structural elements.

While the above description contains many specificities, these should not be construed as limitations on the scope of the invention, but rather as an exemplification of one preferred embodiment thereof. Many other variations are possible, for example:

The frequency of the standing compression wave 14 generated may either be either in the "sonic" or "ultrasonic" frequency range;

The vibration medium 14 may be any fluid medium which can sustain a standing wave, provided the fibrous elements are at least temporarily loosely immersed within the medium;

The fibrous elements 12 can be fibers, filaments, elongated molecule chains, or any similar "whisker" element:

The vibrating surface 16 may be an intrinsic component of the transducer 20 member, or the vibrating surface 16 may alternatively comprise a discrete member attached to the transducer;

The standing waves may be generated in a solid or liquid or gas medium, and the medium may be stationary or moving relative to the transducer; in particular the present invention may be practiced upon a moving liquid;

The vibrating surface 16 may comprise any substantially flat surface, or may alternatively be a non-planar surface, (including parabolic), provided it can be axially oscillated to produce a planar wave; and Subsequent to advantageously aligning the fibrous elements in accordance with the disclosed procedure, the "fluid" medium may be solidified by any common process (including thermal, chemical or other processes) in order to "freeze" the aligned fibers in place.

Accordingly, the scope of the invention should be determined not by the embodiment illustrated, but by the appended claims and their legal equivalents.

We claim:

1. A process for aligning fibrous elements which are loosely immersed in a fluid matrix, comprising the steps of:
   positioning an actuator member adjacent a base material, said base material comprising a plurality of fibrous elements immersed within a fluid matrix;
   positioning a planar reflective surface adjacent said base material;
   aligning said actuator member with said planar reflective surface along a longitudinal axis;
   positioning said planar reflective surface perpendicular to said longitudinal axis;
   introducing vibrational energy into said base material to establish a standing compression wave in said base material between said actuator member and said planar reflective surface;
       wherein said step of introducing vibrational energy into said base material to establish a standing compression wave comprises
           oscillating said actuator member parallel to said longitudinal axis at a first frequency;
           reflecting said standing wave off of said planar reflective surface;
           oscillating said planar reflective surface parallel to said longitudinal axis;
           controlling a phase angle of oscillation of said actuator member;
           controlling a phase angle of oscillation of said planar reflective surface to correspond to said phase angle of oscillation of said actuator member;
           and controlling the magnitude of said first frequency;
   said standing compression wave having at least one node intermediately disposed in said base material between said actuator member and said planar reflective surface;
   and wherein said vibrational energy causes said fibrous elements to accumulate at said node.

2. The process according to claim 1,
   wherein said actuator member comprises a first planar surface, and further comprising positioning said first planar surface perpendicular to said longitudinal axis;
   and wherein said step of oscillating said actuator member comprises oscillating said first planar surface parallel to said longitudinal axis.

3. The process according to claim 2,
   wherein said standing compression wave has a first wavelength;
   wherein said first wavelength is smaller than a first distance measurable across said first planar surface;
   and wherein said standing compression wave has substantially planar wave fronts.

4. The process according to claim 3, wherein said first wavelength is smaller than a second distance measurable across said planar reflective surface.

5. The process according to claim 4, wherein said standing compression wave is a cylindrical planar compression wave.

6. The process according to claim 1, wherein said step of oscillating said planar reflective surface parallel to said longitudinal axis comprises oscillating said planar reflective surface at a second frequency in phase with said first frequency.

* * * * *